United States Patent Office 3,406,319
Patented Oct. 15, 1968

3,406,319
**APPARATUS FOR MONITORING THE OPERA-
TION OF A CLOSED LOOP POSITION CON-
TROL SYSTEM**
Kenneth Milford Faulkes, Bradford, England, assignor to
The English Electric Company Limited, London, England, a British company
Filed Apr. 20, 1964, Ser. No. 360,879
Claims priority, application Great Britain, Apr. 23, 1963,
16,059/60
5 Claims. (Cl. 318—18)

ABSTRACT OF THE DISCLOSURE

This invention is concerned with closed loop position control systems and provides apparatus for monitoring the operation of such systems to detect any one or more of a number of faults and to give an output signal indicative of such fault in a system. The monitoring apparatus includes a limiter circuit for receiving the error signal and a scaling circuit for receiving the velocity signal. These signals are fed to a summing circuit and if there is any change in the relative magnitude of the signals, such as those caused by faults, the output of the summing means will operate a relay to produce an output signal.

---

This invention relates to closed loop control systems and is particularly concerned with apparatus for monitoring the operation of closed loop position control systems.

According to the invention, there is provided apparatus for monitoring the operation of a closed loop position control system of the kind in which the position of an element is controllable in accordance with an error signal which is a measure of the difference between the actual position of the element and a desired position thereof; the monitoring apparatus including means for deriving from the error signal a first signal of constant magnitude and of a sense dependent on the senses of the error signal, means for providing a second signal the sense of which is dependent on the direction of movement of the element and the magnitude of which is dependent on the velocity of the movement thereof, and means for deriving an output signal from the said first and second signals if these signals do not have a predetermined relationship after a predetermined time interval has elapsed subsequent to the initiation of a control action.

Figure 1:
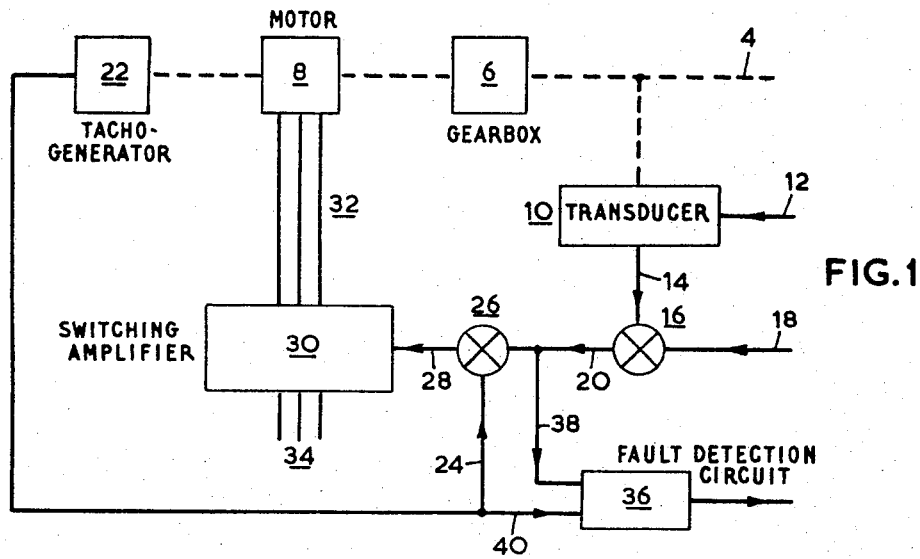
Figure 2:
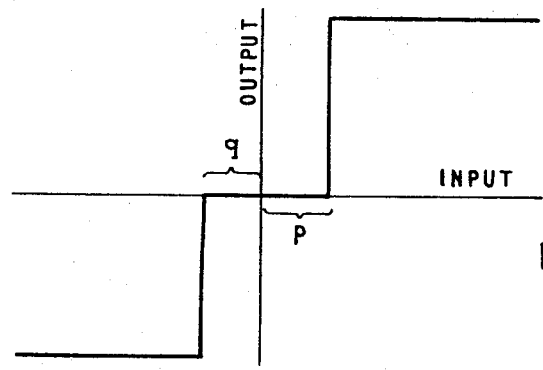
Figure 3:
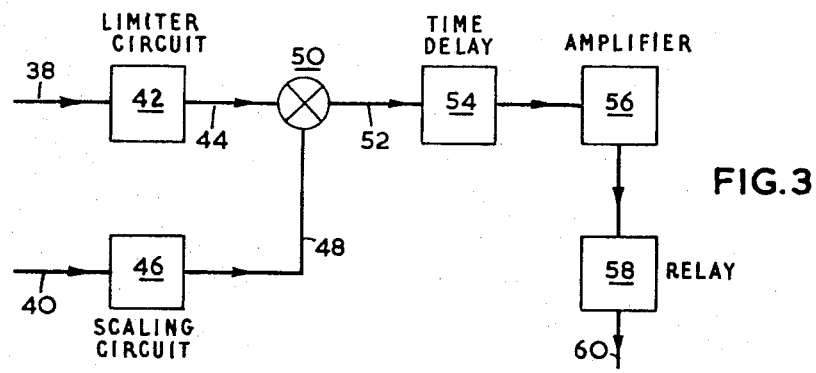

In order that the invention may be more clearly understood, a closed loop position control system and an associated monitoring apparatus embodying the invention will now be described, by way of example, with reference to the accompanying drawing, in which:

FIG. 1 shows the control system in block circuit diagram and indicates the association with the monitoring apparatus, FIG. 2 shows the operating characteristics of the control system, and FIG. 3 shows the monitoring apparatus in detail.

The actuator has an output shaft 4 driven through gear box 6 by a three-phase induction motor 8. A transducer 10, controlled by the output shaft 4, produces an output signal proportional to the instantaneous angular position of the shaft with respect to a datum which is fixed by a choice of a datum signal fed into the transducer on a line 12. The output signal from the transducer 10, hereinafter termed the position signal, is supplied on a line 14 to a summing circuit 16 where it is algebraically added to a reference signal supplied on a line 18. The reference signal has a value proportional to the angular position in which it is desired to position the shaft 4. The summing circuit 16 produces an output on a line 20, this being an error signal having a value proportional to the difference between the position signal and the reference signal.

A tacho-generator 22 is connected to the shaft of the motor 8 and produces an output signal, hereinafter termed the velocity signal, of value proportional to the angular speed of, and having a sense dependent on the direction of rotation of, the shaft 4.

The velocity and error signals are supplied on lines 24 and 20 respectively to a second summing circuit 26 where they are algebraically added. The circuit 26 produces an output, hereinafter termed the control signal, which is in turn supplied on a line 28 to a switching amplifier 30. The switching amplifier 30 provides an output on lines 32 for driving the motor 8. A three-phase power supply is fed into the switch on lines 34.

The switching amplifier, which may be of the semi-conductor type, has a characteristic as illustrated in FIG. 2. The control signal fed into the amplifier on line 28 is represented on the horizontal axis, and the output supplying the motor 8 is represented on the vertical axis. The characteristic shows that the motor will only be driven if the control signal exceeds a specified value as indicated by the references $p$ and $q$. The motor will be stationary when the control signal has a value within the "dead-band" represented by the sum of $p$ and $q$. The characteristic also shows that, after initial acceleration, the motor will attain a constant maximum speed which will be held until the control signal subsequently falls to a value within the "dead-band."

The error signal from the summing circuit 16 is, in addition to being fed into summing circuit 26, fed into a fault detection circuit 36 on a line 38. The velocity signal from the tacho-generator 22 is also supplied to the fault detection circuit 36 on a line 40. This fault detection circuit is illustrated in greater detail in FIG. 3 to which reference will now be made. The error signal is fed on the line 38, into a limiter circuit 42 which provides an output on a line 44 having a magnitude which is constant provided that the error signal has a magnitude greater than a predetermined low value. The velocity signal is fed on the line 40, into a scaling circuit 46 which provides an output on a line 48 having a magnitude which is constant providing that the motor 8 has attained its maximum speed, the magnitude of this signal being arranged to be equal to the constant output from the limiter circuit 42. Signals supplied on the lines 44 and 48 are algebraically added in a summing circuit 50. The output from the summing circuit 50 is supplied on a line 52 to a time delay circuit 54 and is then passed to an amplifier 56. The amplifier output operates a relay 58 which produces an output on a line 60.

The operation of the system will now be described. It will be assumed that the shaft 4 is initially stationary and is to be positioned in a different angular position. A reference signal appropriate to the desired angular position is therefore supplied to the summing circuit 16 on the line 18 and the summing circuit will produce an error signal having a value proportional to the difference between the actual and desired angular positions of the shaft 4. This error signal will be supplied to the summing circuit 26. As the shaft is stationary, the value of the velocity signal on the circuit 24 will be zero and therefore the control signal fed into the switching amplifier 30 will depend only on the value of the error signal. If the control signal has a value greater than $p$ or $q$ (FIG. 2), the amplifier 30 will supply an output to cause the motor 8 to drive the shaft 4 towards the desired position. As the shaft accelerates up to its maximum speed, a velocity signal will be supplied to the summing circuit 26 from the tacho-generator 24 and will be algebraically added to the error signal. As the shaft approaches the desired angular position, the value of the error signal will drop causing a consequent fall in the value of the control signal. When the control signal value falls within the "dead-band" of the amplifier 30, the output of the latter will fall to zero and the motor will come to rest causing the velocity signal to fall to zero.

When the motor is running at its maximum speed driving the shaft to the desired position, the velocity signal from the tacho-generator 22 will be constant and therefore the output signal from the scaling circuit 46 (FIG. 2) will have a constant magnitude. If the difference between the actual and the desired positions of the shaft is sufficiently great the output from the limiter circuit 42 will also be constant. As explained above, the constant outputs of the limiter and scaling circuits are arranged to be equal and, provided the shaft is moving towards the desired position, their senses will be opposite so that their algebraic sum is zero. Consequently the summing circuit 50 produces no output and the relay 58 is not operated to produce an output signal.

Any faults in the control system, however, which result in a relative change in the magnitudes of the signals from the limiter circuit 42 and the scaling circuit 46 will result in an output signal from the summing circuit 50 and the relay 58 will then be operated to produce an output signal.

Such faults, which usually affect only one of the signals, include among others movement of the shaft 4 in the opposite direction to the desired direction, failure of the motor 8 to run up to speed, absence of a signal from the tacho-generator 22, and absence of a signal from the transducer 10.

It will thus be seen that the more important faults to which the control system is liable are all detectable by the fault detection circuit 36, and this circuit then causes the relay 58 to produce an output signal, indicating the presence of a fault, which can then be used to initiate protective or warning action.

The time delay circuit 54 inhibits operation of the circuit 36 until sufficient time has elapsed from a change in reference signal for the motor to have reached its maximum speed. During initial acceleration of the motor, the velocity signal from the tacho-generator will be small and therefore, even though the shaft 4 is moving in the correct direction, the summing circuit 50 will produce an output signal because the output from the scaling circuit 46 will not balance the output from the limiter circuit 42. The time delay circuit prevents this signal operating the relay 58 and hence giving a false fault indication.

What I claim as my invention and desire to secure by Letters Patent is:

1. A closed loop control system for controlling the value of a variable, including first means for producing a first signal having a sense dependent on the sense of the error between the actual value of the variable and a desired value to which the variable is required to change, second means for producing a second signal having a sense dependent on the direction of the rate of change of the variable when it changes as a result of action by the control system, comparing means responsive to the first and second signals for comparing the senses of the first and second signals and for producing an output signal indicating whether the error is increasing or decreasing, the said first signal having sense and magnitude dependent respectively on the sense and magnitude of the error between the actual value of the variable and the said desired value, and the said second signal having a sense and magnitude dependent respectively on the direction and magnitude of the said rate of change of the variable, the comparing means comprising means for adding algebraically the first and second signals, the said output signal being constituted by a signal dependent on the algebraic sum, means for limiting to a predetermined maximum the magnitude of the first signal when the error between the actual value of the variable exceeds a predetermined small amount and means for limiting to an equal predetermined maximum the magnitude of the second signal, means for limiting the magnitude of the second signal comprising means for limiting the said rate of change of the variable to a predetermined maximum value, means for delaying for a predetermined time measured from the time instant when the variable was first required to change to the desired value the time instant when the comparing means produces the said output signal, the predetermined time being large compared with the time taken for the variable to attain its said maximum value.

2. Apparatus for monitoring the operation of a closed loop position control system of the kind in which the position of an element is controllable in accordance with an error signal which is a measure of the difference between the actual position of the element and a desired position thereof; the monitoring apparatus including means for deriving from the error signal a first signal of constant magnitude and of a sense dependent on the sense of the error signal, said control system including means for providing a second signal the sense of which is dependent on the direction of movement of the element and the magnitude of which is dependent on the velocity of the movement thereof, means for receiving said second signal and means for deriving an output signal from the said first and second signals if these signals do not have a predetermined relationship after a predetermined time interval has elapsed subsequent to the initiation of a control action.

3. Apparatus according to claim 2 in which the means for deriving the first signal of constant magnitude from the error signal is responsive only to a value of the error signal of above a predetermined low value.

4. Apparatus according to claim 2 in which the means for providing the second signal includes a tachometer generator the speed of operation of which is proportional to the speed of movement of the element, the means for receiving said second signal including a scaling circuit to which the output of the tachometer generator is supplied, the second signal being derived from the output of the scaling circuit.

5. Apparatus according to claim 2 in which the means for deriving an output signal from the first and second signals includes a summing circuit in which the first and second signals are compared, and a time delay circuit to which the output of the summing circuit is supplied, the output signal being derived from the output of the time delay circuit.

References Cited

UNITED STATES PATENTS

| | | | |
|---|---|---|---|
| 3,054,039 | 9/1962 | Meredith | 318—489 |
| 3,114,869 | 12/1963 | Goodwin | 318—28 |
| 3,122,687 | 2/1964 | Romvari | 318—28 |
| 3,241,027 | 3/1966 | Albright | 318—289 |
| 3,275,917 | 9/1966 | Medlinski | 318—18 |

BENJAMIN DOBECK, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,406,341                        October 15, 1968

Kenneth Kupferberg et al.

It is certified that error appears in the above identified patent and that said Letters Patent are hereby corrected as shown below:

In the heading to the printed specification, line 4, "Paul J. Birman" should read -- Paul S. Birman --.

Signed and sealed this 17th day of March 1970.

(SEAL)
Attest:

Edward M. Fletcher, Jr.
Attesting Officer

WILLIAM E. SCHUYLER, JR.
Commissioner of Patents